United States Patent [19]

Kassal

[11] 4,161,471

[45] Jul. 17, 1979

[54] ELASTOMER MODIFIED UNSATURATED MOLDING COMPOSITIONS

[75] Inventor: Robert J. Kassal, Wilmington, Del.

[73] Assignee: E. I. Du Pont de Nemours and Company, Wilmington, Del.

[21] Appl. No.: 896,043

[22] Filed: Apr. 13, 1978

[51] Int. Cl.² .................... C08K 3/06; C08L 11/00; C08L 19/00; C08L 67/06
[52] U.S. Cl. .................... 260/40 R; 260/40 TN; 525/37; 525/38; 525/39; 525/40; 525/169; 525/168
[58] Field of Search ............... 260/862, 40 R, 40 TN

[56] References Cited

U.S. PATENT DOCUMENTS

| | | | |
|---|---|---|---|
| 3,231,634 | 1/1966 | Wismer et al. | 260/862 |
| 3,733,370 | 5/1973 | Thompson et al. | 260/862 |

Primary Examiner—Sandra M. Person

[57] ABSTRACT

Filled unsaturated ester bulk molding, sheet molding, premix or mat molding compositions are modified with elastomer to give finished products with both improved impact strength and improved surface characteristics. The elastomeric modifier is selected from the group consisting of chloroprene polymers and hydrocarbon polymers such as ethylene/propylene di-, ter-, or tetrapolymers.

8 Claims, No Drawings

ELASTOMER MODIFIED UNSATURATED MOLDING COMPOSITIONS

DESCRIPTION

Technical Field

This invention relates to filled unsaturated ester bulk molding, sheet molding, premix or mat molding compositions and to products produced therefrom. Typical of such compositions are thermosetting formulations based primarily on polyester-styrene resins and those based on vinyl ester-styrene resins. Such compositions can be reinforced by incorporating into the composition one or more fibrous materials such as continuous or chopped glass fiber.

BACKGROUND ART

Unsaturated ester molding compositions suffer from a variety of disadvantages depending on the particular composition and the particular desired end use. There has been much effort made toward minimizing or eliminating such disadvantages by modifying the basic compositions.

For example, U.S. Pat. No. 3,416,990, granted Dec. 17, 1968, to Robinson, states that the thermosetting character of polyester molding compositions presents certain manufacturing disadvantages and that attempts to overcome these with solid propylene polymers gives compositions with poor adhesion to glass. Robinson proposes to overcome this deficiency with compositions in which the propylene polymer has been partially modified by reaction with certain ethylenically unsaturated compounds.

U.S. Pat. No. 3,231,634, granted Jan. 25, 1966, to Wismer et al., states that polyester molding compositions which utilize unsaturated polyester frequently give finished products that are subject to "cracking or crazing or contain pits which render the casting porous or will not stand severe shock without breakage." Wismer discloses that these problems can be overcome or minimized by incorporating a small amount of polymer of a conjugated diene, for example, butadiene. It is now well recognized that inclusion of butadiene polymers into polyester molding compositions gives finished products with improved impact strength and possibly even reduced porosity, but such products generally lack the improved surface characteristics that are achieved with use of the composition of the present invention. Furthermore, although Wismer discloses (column 3, line 52) that fillers can be added, the clear focus of Wismer is toward unfilled compositions.

U.S. Pat. No. 3,701,748, granted Oct. 31, 1972, to Kroekel, states that polyester molding compositions frequently exhibit an unacceptable level of volume shrinkage when cured, and yield fibrous reinforced finished products with poor surface characteristics. Kroekel discloses that these problems can be overcome by including a thermoplastic polymer, for example, polymethacrylates, in the polyester composition.

U.S. Pat. No. 3,993,710, granted Nov. 23, 1976, to Alberts et al., notes similar problems to those observed by Kroekel and discloses using certain thermoplastic ethylene copolymers as an answer to these problems. Indeed, it is now well recognized that surface characteristics of products produced from polyester molding compositions can be greatly improved with thermoplastic polymers such as polyethylene and polymethacrylates; however, products made from such compositions generally lack high impact strength.

None of these techniques for improving conventional unsaturated polymerizable molding compositions has been able to achieve a finished product with both high impact strength and superior surface characteristics.

DISCLOSURE OF THE INVENTION

The present invention relates to filled unsaturated ester bulk molding, sheet molding, premix or mat molding compositions, such as polyester resin and vinyl ester resin compositions, which are modified with elastomer to give finished products with both high impact strength and superior surface characteristics. The elastomeric modifier is selected from the group consisting of chloroprene polymers and hydrocarbon polymers. Suitable hydrocarbon polymers include ethylene/propylene di-, ter-, or tetrapolymers. Such compositions can be reinforced by incorporating into the composition one or more fibrous materials. Suitable fibrous materials include continuous or chopped glass fiber.

By improved impact strength there is actually meant a combination of improved impact resistance, (i.e., the finished product is not cracked by impact of higher force) and resistance to crack propagation (i.e., if cracks do appear, they do not extend as far from the point of impact).

By superior surface characteristics, there is meant low profile and a high degree of surface smoothness, suitable to permit coating with paints and lacquers, such as are used on automotive body parts.

In addition to the polymerizable unsaturated ester material, such molding compositions generally include a polymerizable monomer. When such compositions are compounded for use, there is generally added an initiator and inorganic particulate filler. Release agents can also be added. The composition of the present invention includes, in addition to the polymerizable unsaturated ester material and the polymerizable monomer, an elastomeric modifier selected from the group consisting of chloroprene polymers and hydrocarbon polymers. In a fashion analagous to conventional molding compositions, the compositions of the present invention are compounded for use with a polymerization initiator and inorganic particulate filler.

Still further improvement in impact strength can be achieved by use of up to 2.5 weight % of coagents, e.g., dimaleimides or triallylcyanurate. Suitable dimaleimides include N,N'-m-phenylenedimaleimide and N,N'-m-tolylenedimaleimide. See also *Encyclopedia of Polymer Science and Technology*, Volume 4, pages 348-9, Interscience (1966).

Thus the present invention includes compositions comprising a polymerizable ester material, a polymerizable monomer and an elastomeric modifier selected from the group consisting of chloroprene polymers and hydrocarbon polymers. In particular, the composition of the present invention comprises 10–60, preferably 20–50, wt. % of a polymerizable ester material, 39–89 wt. %, preferably 45–70 wt. %, of a polymerizable monomer and 1–30 wt. %, preferably 5–15 wt. %, of an elastomeric modifier. More specifically, the composition of the present invention comprises 10–60 wt. %, preferably 20–50 wt. % of an $\alpha,\beta$-ethylenically unsaturated polymerizable ester selected from the group consisting of polyester and vinyl ester, 39–89 wt. %, preferably 45–70 wt. %, of a polymerizable monomer and 1–30 wt. %, preferably 5–15 wt. % of an elastomeric modifier selected from the group consisting of chloroprene polymers and hydrocarbon polymers, wherein the hydrocarbon polymer is an ethylene/propylene di-, ter-, or tetrapolymer.

When compounding for use, 0.1–5 parts by weight of polymerization initiator is added to the composition of the present invention per 100 parts of said composition. In addition, an inorganic particulate filler is added in the amount of 15–50 parts of filler per 100 parts of said composition, and the coagent is added in the amount of up to 2.5 wt. % (based on monomer plus polymer) preferably 0.3–0.7%, most preferably about 0.5%.

The polymerizable ester material and polymerizable monomer suitable for use in the compositions of the present invention and the polymerization catalyst and inorganic particulate filler suitable for use with the compositions of the present invention are those which are generally used in the $\alpha,\beta$-unsaturated ester molding compositions known in the art, provided, however, that with respect to polymerizable polyester compounds, the unsaturation number (i.e., molecular weight per double bond) is between about 150 and 250. For example, suitable polymerizable polyester compounds, polymerizable monomers and polymerization catalysts are discussed in some detail in the above-mentioned Alberts patent, U.S. Pat. No. 3,993,710. It is stated there that suitable polyesters are prepared by polycondensation of at least one $\alpha,\beta$-ethylenically unsaturated dicarboxylic acid having 4 or 5 carbon atoms or the ester-forming derivatives of such acids with at least one polyhydroxy compound, preferably dihydroxy compounds having 2 to 8 carbon atoms, optionally mixed with up to 90 mole %, based on the unsaturated acid component, of (a) at least one saturated aliphatic dicarboxylic acid having 4 to 10 carbon atoms or (b) a cycloaliphatic or aromatic dicarboxylic acid having 8 to 10 carbon atoms or (c) the ester-forming derivatives of such acids. Suitable polyesters are described by J. Bjorksten et al. *Polyesters and their Applications,* Reinhold Pub. Corp. New York, 1956. Examples of preferred unsaturated dicarboxylic acids or their derivatives are maleic acid or maleic anhydride and fumaric acid. However, it is also possible to use mesaconic acid, citraconic acid, itaconic acid or chloromaleic acid. Examples of the aromatic, cycloaliphatic or saturated aliphatic dicarboxylic acids or their derivatives are phthalic acid or phthalic anhydride, isophthalic acid, terephthalic acid, hexahydrophthalic acid or tetrahydrophthalic acid or their anhydrides, endomethylenetetrahydrophthalic acid or its anhydride, succinic acid or succinic anhydride and succinic acid esters and chlorides, adipic acid and sebacic acid. In order to produce resins of low flammability it is also possible to use hexachloroendomethylenetetrahydrophthalic acid (Het-acid), tetrachlorophthalic acid or tetrabromophthalic acid. Flame resistance can also be obtained by the addition of halogen-containing compounds which are not co-condensed in the polyester, such as, for example, chloroparaffin. Polyesters to be used preferentially contain maleic acid units and/or fumaric acid units of which up to 25 mole % can be replaced by phthalic acid or isophthalic acid units. Examples of dihydric alcohols are ethylene glycol, 1,2-propanediol, 1,3-propanediol, diethylene glycol, dipropylene glycol, 1,3-butanediol, 1,4-butanediol, neopentyl glycol, 1,6-hexanediol, perhydrobisphenol and others. Ethylene glycol, 1,2-propanediol, diethylene glycol and dipropylene glycol are preferred.

Further modifications are possible by the incorporation of up to 10 mole %, based on the alcohol component or acid component, of monohydric and more than dihydric alcohols, such as butanol, benzyl alcohol, cyclohexanol and pentaerythritol and of monoallyl ethers, diallyl ethers and triallyl ethers and benzyl ethers of trihydric and polyhydric alcohols according to DT-AS (German Published Specification) 1,024,654, as well as by the incorporation of monobasic acids such as benzoic acid, oleic acid, linoleic acid and ricinoleic acid.

The preferred polyesters must have a high degree of crosslinking since they are molded, and released from the mold, at high temperatures (140° to 160° C.) and must therefore have a correspondingly high heat distortion point.

The acid numbers of the polyesters should be between 1 and 100, preferably between 5 and 70; the OH numbers should be between 10 and 100, preferably between 20 and 50; and the molecular weight should be between approximately 500 and 10,000, preferably between approximately 700 and 3,000 (values of up to 5,000 are measured by vapor pressure osmometry in dioxane and acetone; if the values differ from each other, the lower one is taken to be the more accurate one; values above 5,000 are measured by membrane osmometry in acetone).

Examples of suitable vinyl ester compounds are discussed in some detail in U.S. Pat. No. 3,634,542, granted Jan. 11, 1972 to Dowd et al., U.S. Pat. No. 3,564,074, granted Feb. 16, 1971, to Swisher et al, and in *Unsaturated Polyester Technology,* Bruins, P. F., ed., pages 315–42, Gordon and Breach Science Publishers, N. Y. (1976).

Dowd describes suitable vinyl ester material as comprising a mixture of (1) a partial half ester of (a) a hydroxy-substituted ethylenically unsaturated polyester reaction product of a polyepoxide and an ethylenically unsaturated organic carboxylic acid and (b) a polycarboxylic acid anhydride and (2) a dissimilar polymeric material possessing a plurality of epoxy groups.

Dowd discloses that these vinyl esters can be prepared by mixing and reacting (a) a hydroxy-substituted unsaturated polyester having the general formula

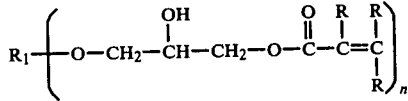

wherein $R_1$ is an aromatic radical, R is hydrogen or alkyl and n is an integer of at least 2, and preferably 2 to 6, with controlled amounts of (b) polycarboxylic acid anhydride, or alternatively, by reacting a polyepoxide with the unsaturated monocarboxylic acid and when the reaction is substantially complete, adding the acid anhydride and continuing the reaction until the anhydride is reacted.

Swisher describes suitable vinyl ester materials as those which are prepared by contacting a polyepoxide with an ethylenically unsaturated monocarboxylic acid to produce a reaction product which contains, in part, the functional group

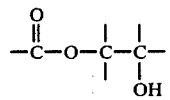

produced by the interaction of an epoxide group with a carboxylic acid group, and then further condensation of the secondary hydroxyl groups contained in the above reaction product with a dicarboxylic acid anhydride to produce pendant half ester groups.

Swisher states that preferred polyepoxides include glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

Ethylenically unsaturated monocarboxylic acids suitable for reaction with the polyepoxide include the $\alpha,\beta$-unsaturated monocarboxylic acids and the hydroxyalkyl acrylate or methacrylate half esters of dicarboxylic acids. The $\alpha,\beta$-unsaturated monocarboxylic acids include acrylic acid, methacrylic acid, crotonic acid, cinnamic acid and the like. The hydroxyalkyl groups of the acrylate or methacrylate half esters preferably contain from two to six carbon atoms and include such groups as hydroxyethyl-beta-hydroxypropyl, beta-hydroxybutyl and the like. It is also intended to include those hydroxyalkyl groups in which an ether oxygen is present. The dicarboxylic acids include phthalic acid, chlorendic acid, tetrabromophthalic acid, adipic acid, succinic acid, glutaric acid, maleic acid, fumaric acid, citraconic acid, itaconic acid, halogenated maleic or fumaric acids, mesaconic acid and the like. Mixtures of ethylenically unsaturated carboxylic acids may be used.

Preferred dicarboxylic acid anhydrides include maleic anhydride, citraconic anhydride, itaconic anhydride, phthalic anhydride, tetrabromophthalic anhydride, chlorendic anhydride and the like. Advantageously, a polymerization inhibitor, such as the methyl ether of hydroquinone or hydroquinone, may be added since elevated temperatures are useful in preparing the half esters.

Suitable polymerizable monomers are the unsaturated compounds customary in polyester technology, which preferably carry $\alpha$-substituted vinyl groups or $\beta$-substituted allyl groups, preferably styrene, but also, for example, nuclear-chlorinated and nuclear-alkylated styrenes, wherein the alkyl groups can contain 1 to 4 carbon atoms, such as, for example, vinyltoluene, divinylbenzene, $\alpha$-methylstyrene, t-butylstyrene and chlorostyrenes; vinyl esters of carboxylic acids with 2-6 carbon atoms, preferably vinyl acetate; vinylpyridine, vinylnaphthalene, vinylcyclohexane, acrylic acid and methacrylic acid and/or their esters with 1-4 carbon atoms in the alcohol component, maleic acid half-esters and diesters with 1-4 carbon atoms in the alcohol component, maleic acid half-amides and diamides or cyclic imides such as N-methylmaleimide or N-cyclohexylmaleimide; allyl compounds, such as allylbenzene and allyl esters such as allyl acetate, allyl acrylate, allyl methacrylate, phthalic acid diallyl ester, isophthalic acid diallyl ester, fumaric acid diallyl ester, allyl carbonates, diallyl carbonates, triallyl phosphate and triallyl cyanurate.

Suitable polymerization initiators include styrene-soluble radical-forming agents, preferably organic peroxides, which may be used in the presence of reducing agents. To the compositions of the present invention are added 0.1 to 5% by weight of these polymerization initiators. Examples of suitable initiators are diacyl peroxides, such as diacetyl peroxide, dibenzoyl peroxide and di-p-chlorobenzoyl peroxide, peroxy-esters such as t-butyl peroxyacetate, t-butyl peroxybenzoate, dicyclohexyl peroxydicarbonate, alkyl peroxides such as bis-(t-butylperoxy)butane, dicumyl peroxide, t-butyl cumyl peroxide, hydroperoxides such as cumene hydroperoxide, and t-butyl hydroperoxide or azoisobutyrodinitrile. In addition, peroxyketals, for example, 1,1-bis(t-butylperoxy)3,3,5-trimethylcyclohexane and 1,1-bis(t-butylperoxy)cyclohexane are also suitable for polymerization catalysts.

Suitable inorganic fillers for use in the compositions of the present invention are also as described in the prior art, for example, the above-mentioned Kroekel U.S. Pat. No. 3,701,748, where it is stated that suitable fillers which are usually inert and inorganic include, for example, clay, talc, calcium carbonate, silica, calcium silicate, etc. Suitable fibrous reinforcing materials include glass fibers in one form or another, such as glass fabrics, chopped glass strands, chopped or continuous strand glass fiber mat, asbestos, cotton, synthetic organic fibers and metals. In addition, hydrated alumina and the mineral fiber, rock wool, are also considered suitable for the compositions of the present invention.

As mentioned above, the elastomeric modifier used in the compositions of the present invention can be selected from the group consisting of chloroprene polymers and hydrocarbon polymers. The term "chloroprene polymer" is not limited to homopolymers of chloroprene, but also includes copolymers of chloroprene with sulfur and/or with at least one copolymerizable organic monomer wherein chloroprene constitutes at least 50 wt. % of the organic monomer make-up of the copolymer.

Chloroprene polymers which can be used in the compositions of the present invention can be prepared by polymerizing chloroprene either alone or with at least one other comonomer in aqueous emulsion in the presence of sulfur and/or an organic sulfur-containing chain transfer agent. Various methods of polymerization of chloroprene are disclosed, for example, in *Encyclopedia of Polymer Science and Technology*, John Wiley & Sons, Vol. 3, pages 711–712, (1965). Specific polymers and methods of their preparation are described, for example, in U.S. Pat. Nos. 2,494,087; 2,567,117; 2,576,009; 3,397,173; 3,655,827; and 3,686,156. The most preferred chloroprene polymers include low viscosity polychloroprene, such as Neoprene WM-1, chloroprene polymer A described below. The most commonly used chain transfer agents are alkyl mercaptans and dialkyl xanthogen disulfides.

Representative comonomers which can be copolymerized with chloroprene include vinyl aromatic compounds such as styrene, the vinyltoluenes and vinylnaphthalenes; aliphatic conjugated diolefin compounds such as 1,3-butadiene, isoprene, 2,3-dimethyl-1,3-butadiene, and 2,3-dichloro-1,3-butadiene; vinyl ethers, esters and ketones such as methyl vinyl ether, vinyl acetate and methyl vinyl ketone; esters, amides and nitriles of acrylic and methacrylic acids such as ethyl acrylate, methyl methacrylate, methyl acrylamide and acrylonitrile. Other suitable chloroprene polymers include low molecular weight chloroprene polymers such as are discussed in *The Neoprenes*, Murray et al. Du Pont, Wilmington, Delaware (1968) pages 84 through 86 and U.S. Pat. No. 4,054,731, granted Oct. 18, 1977, to Narubashi et al.

Hydrocarbon polymers are also suitable elastomeric modifiers for the polyester molding compositions of the present invention. As mentioned above, such hydrocarbon polymers include ethylene/propylene copolymers. These encompass both ethylene/propylene dipolymers and copolymers of ethylene/propylene and at least one nonconjugated diene. These copolymers are conventionally prepared by interpolymerizing the monomers in the presence of a coordination catalyst system.

Preferred ethylene/propylene copolymers contain about 30–70 weight percent ethylene, about 20–60 weight percent propylene, and up to 10 weight percent of at least one nonconjugated diene. The nonconjugated diene is preferably a cyclic diene such as dicyclopentadiene, and 5-alkenyl-substituted-2-norbornenes, e.g., 5-ethylidene-2-norbornene and 5-methylene-2-norbornene. Of the cyclic dienes, ethylidenenorbornene is especially preferred.

The preferred open chain nonconjugated diene is 1,4-hexadiene. The most preferred hydrocarbon polymers include ethylene/propylene/hexadiene terpolymers which have been thermally cracked, such as in Example 6, below.

The ethylene/propylene/diene terpolymers can be prepared by copolymerization of the monomers in an inert solvent using a coordination catalyst system such as diisobutylaluminum chloride and vanadium oxychloride. Details of their preparation are given in U.S. Pat. Nos. 2,933,480; 3,000,866; 3,260,708; and in M. Sittig, *Stereo Rubber and Other Elastomer Processes*, Noyes Development Corp., Park Ridge, N.J., (1967).

A second particularly useful class are branched tetrapolymers prepared by copolymerizing ethylene, propylene, a monoreactive nonconjugated diene, and a direactive nonconjugated diene. A preferred tetrapolymer is that of ethylene/propylene/1,4-hexadiene/norbornadiene. Details on this class of elastomeric ethylene-propylene copolymer are given in British Pat. No. 1,195,625, published June 17, 1970.

The compositions described herein can be used in known bulk molding, sheet molding, premix or mat molding operations. In bulk molding and sheet molding operations, one begins by preparing a resin paste. Polyester resin pastes containing impact modifiers can be prepared by methods known in the art of preparing standard polyester resin pastes. This is frequently accomplished by adding the resin, fillers, colorants, thickeners, lubricants and initiators to a suitable vessel and then mixing thoroughly with a high-speed, high-intensity mixer such as a Cowles dissolver. In those cases where the impact modifier and polyester resin are too incompatible to produce a uniform blend by this procedure, two variations may be used. In the first variation, if the impact modifier solution is not extremely viscous, pastes containing the polyester and the impact modifier can be made separately as described above and these pastes can be blended subsequently by adding the modifier paste to that of the polyester resin. In the second variation, which is a little simpler and especially useful when the impact modifiers are extremely viscous, the polyester paste without modifier can be made as described above, and while still in the mixer, the required amount of modifier solution can be added followed by appropriate amounts of filler, release agent, etc. Blending on the mixer is continued until the mixture is sufficiently uniform for use. Fibrous reinforcements are then combined with the paste using the standard techniques appropriate to the particular molding process to be employed.

In bulk bolding operations, the paste is then mixed with glass fibers in a low-shear mixer, such as a Sigma mixer. The resulting doughlike mass is easily handled and may be molded by compression or injection molding techniques at elevated temperatures (100°–180° C.) and pressures (0.7–10 MPa) for 15 s to 15 min to effect curing to a rigid product, which is ejected hot from the mold. In sheet molding compounds, the resin paste is prepared as described above and the fiberglass is added using an SMC machine, such as is shown schematically in *Proceedings of the 33rd Annual Conference, Reinforced Plastics Composites Institute*, Section 4-B, page 4, (FIG. 1, Society of the Plastics Industry, Inc., N.Y. (1978). The impregnated sheet is usually allowed to "thicken" or "maturate" (typically for one to five days at or just above room temperature), then is cut to size and compression molded between matched metal die molds using conditions analogous to those for bulk molding compositions. For premix molding all components including glass fibers can be mixed in an intensive mixer and molded as in bulk molding. In preform or mat molding the resin may be used in the neat form or mixed with inert particulate fillers (maintaining a sufficiently fluid consistency). Glass fiber fabrics may also be used either alone or in combination with glass fiber mats. Colorants, pigments, release agents, and polymerization initiators are also incorporated into the mixtures. The fluid is poured over the preformed glass fiber mat (which may contain a binder for the glass) and placed in a matched die mold where flow of the resin mixture is accomplished and cross-linking is effected under conditions of moderate heat and pressure.

The following examples identify various compositions of the present invention and their relative impact strength defined in terms of a compressive impact crack rating and a notched Izod impact rating. The compressive impact crack test was run on a Gardner heavy duty variable impact tester. The sample was placed between the weight and the top of the punch and the weight was dropped from several different heights onto different sections of the plaque. The impact rating is a measure of the lowest impact force which produces cracks which are visible after staining with a dye. Impact force is reported in joules. The notched Izod impact test was conducted using the ASTM D256 method. The notched Izod rating is reported in joules/meter notch. The inherent viscosity of EPDM elastomers is determined at 30° C. using a 0.1 g sample in 100 cm$^3$ of tetrachloroethylene. The inherent viscosity of polychloroprene is determined at 30° C. using a 0.2 g sample in 100 cm$^3$ of tetrahydrofuran. The unsaturation number is calculated as molecular weight per double bond. All quantities expressed in "parts" or "percent" are by weight unless stated otherwise.

The ingredients used in these examples are listed below.

(1) Chloroprene Polymer A: a low viscosity (Mooney ML 1+2.5 (100° C.) 36–44, inherent viscosity about 1.5 dl/g) polychloroprene sold as Neoprene WM-1 by E. I. du Pont de Nemours and Co.

(2) Chloroprene polymer B: a chloroprene/methacrylic acid copolymer (Mooney ML 1+2.5 (100° C.) 45–55) sold as Neoprene AF by E. I. du Pont de Nemours and Co.

(3) Chloroprene polymer C: a low-viscosity ($\eta_{inh}$ 0.46 dl/g) polychloroprene.

(4) Chloroprene polymer D: a sulfur-modified polychloroprene stabilized with a thiuram disulfide (Mooney ML 1+2.5 (100° C.) 55–65, inherent viscosity about 1.4 dl/g) sold as Neoprene GN by E. I. du Pont de Nemours and Co.

(5) Hydrocarbon polymer A: an ethylene/47% propylene/3.3% 1,4-hexadiene polymer of Mooney viscosity 20 ML 4 (100° C.) and inherent viscosity 1.6 dl/g.

(6) Hydrocarbon polymer B: an ethylene/31% propylene/4.4% 1,4-hexadiene/0.3% norbornadiene polymer of Mooney viscosity ML 4 (100° C.) about 25 and inherent viscosity 1.2 dl/g.

(7) Polyester resin I: a high-reactivity resin believed to contain approximately 70% propylene glycol maleate and 30% styrene, sold as "Paraplex" P340 by Rohm & Haas Co., unsaturation number=154.

(8) Polyester resin II: a high-reactivity, styrene type polyester resin sold as GR63003 by W. R. Grace Co., unsaturation number=176.

(9) Polyester resin III: a polyester resin sold as OCF E606 by Owens-Corning Fiberglass Corp., unsaturation number=220.

(10) Polyester resin IV: a polyester containing a dissolved or dispersed thermoplastic for shrinkage and profile control, sold as "Selectron" 50344 by PPG industries, Inc., unsaturation number=224.

(11) Magnesium oxide dispersion: 33% magnesium oxide dispersed in an unsaturated polyester, sold as "Marco" Modifier M by W. R. Grace.

(12) Free radical catalyst: 45% 2,5-dimethyl-2,5-bis(t-butyl peroxy)hexyne-3 on an inert carrier, sold as "Luperco" 130XL by the Lucidol Division of Pennwalt.

(13) Chopped fiberglass roving I: 1.27 cm roving sold as OCF K832B by Owens-Corning Fiberglas Corp.

(14) Chopped fiberglass roving II: 1.27 cm roving sold as OCF 832BB by Owens-Corning Fiberglas Corp.

(15) Chopped fiberglass roving III: 1.27 cm roving sold as OCF KM832 by Owens-Corning Fiberglas Corp.

(16) Vinyl ester resin: "Derekane" 786 sold by Dow Chemical Co. Believed to be approximately 40% in styrene of a compound of the formula $$CH_2=C-C-O(CH_2-C-CH_2-O-C_6H_4-C-C_6H_4-O)_nCH_2-C-CH_2OC-C=CH_2,$$

(with H, O, H, CH₃, CH₃, H, O, H and R substituents as shown)

where n=1-2 and R is hydroxyl or a pendant half ester, as described by Swisher.

EXAMPLE 1

A polyester paste (A) was prepared on a "Cowles" dissolver (7.6 cm blade high-shear mixer, manufactured by Cowles Dissolver Corp.) by blending until uniform 600 g polyester resin I with a mixture of 760 g Camelwite grade calcium carbonate, 40 g zinc stearate and 6 g t-butyl perbenzoate. A modifier paste (B) of a 20% chloroprene polymer A solution in styrene was similarly prepared. Paste A (400 g) was blended with 48 g paste B and 4 g magnesium oxide dispersion. The blend (367 g) was mixed with 92 g chopped fiberglass roving I in a Sigma mixer. The sample was removed from the mixer and allowed to chemically thicken in a sealed jar. It was then molded into 15.2×15.2×0.25 cm plaques in a compression mold for 6 min at 150° C. Two other samples were prepared using the above procedure with (1) chloroprene polymer B and (2) no chloroprene polymer. The results are shown below.

| Polymer | Compressive Impact Crack Rating (J) |
|---|---|
| Chloroprene Polymer A | 0.5–0.7 |
| Chloroprene Polymer B | 0.5–0.7 |
| None | <0.2 |

EXAMPLE 2

Using the procedure of Example 1, a resin paste (A) was prepared containing 600 parts polyester resin I, 760 parts Camelwite grade calcium carbonate, 40 parts zinc stearate, 6 parts t-butyl perbenzoate, 3 parts N,N'-m-phenylenedimaleimide and 3 parts free radical catalyst. A modifier paste (B) was prepared with 600 parts of a 20% solution of hydrocarbon polymer A in styrene, 760 parts Camelwite grade calcium carbonate, 40 parts zinc stearate, 6 parts t-butyl perbenzoate, 3 parts N,N'-m-phenylenedimaleimide and 3 parts free radical catalyst. Paste A (100 g) was blended with 150 g paste B and 4 g magnesium oxide dispersion. This blend (208 g) was mixed with 52 g chopped fiberglass roving I, using the procedure of Example 1. The sample was allowed to thicken and was molded as in Example 1. The plaques had a compressive impact rating of 2.3 J.

EXAMPLE 3

A resin paste (A) was prepared as in Example 2 except that polyester resin II was used instead of polyester resin I. Similarly, a modifier paste (B) was prepared as in Example 2 except that a 20% solution of polychloroprene polymer A in styrene was used instead of the hydrocarbon polymer A solution. Paste A (150 g) was blended with 100 g paste B and 4 g magnesium oxide dispersion. This blend (212 g) was mixed with 42.4 g chopped fiberglass roving I. After maturation and molding, the sample had a notched Izod impact rating of 250 J/m notch, compared to 170 J/m notch for a similarly prepared control containing no chloroprene polymer modifier.

EXAMPLE 4

Example 3 was repeated substituting polyester resin III for polyester resin II and hydrocarbon polymer A for the chloroprene polymer. The modified sample had a notched Izod impact rating of 180 J/m notch vs. 130 J/m for an unmodified control.

EXAMPLE 5

A resin paste (A) was prepared from 600 parts polyester resin I, 776 parts Camelwite grade calcium carbonate, 24 parts zinc stearate, 6 parts t-butyl perbenzoate and 3 parts each of N,N'-m-phenylenedimaleimide and free-radical catalyst. A modifier paste (B) was prepared from 600 parts of a 20% solution of hydrocarbon polymer B in styrene, 776 parts Camelwite grade calcium carbonate, 24 parts zinc stearate, 6 parts t-butyl perbenzoate and 3 parts each of N,N'-m-phenylenedimaleimide and free-radical catalyst. Paste A (200 g) was blended with 300 g paste B and 8.75 g magnesium oxide dispersion. The blend (450 g) was mixed with 90 g chopped fiberglass roving I. The mixed compound was allowed to mature and was molded at 150° C. The sample had a notched Izod impact rating of 250 J/m notch, while a control without modifier had a rating of 170 J/m.

EXAMPLE 6

A thermally cracked hydrocarbon polymer was prepared by feeding hydrocarbon polymer A to a 1.90 cm Brabender extruder to which had been attached a "Kenics" static mixer to serve as a thermal cracker. The extruder was operated at 50 rpm with the following temperature profile: extruder zones 1, 2, and 3 were 190°, 260°, and 340° C. respectively; "Kenics" mixer zones 1, 2, 3, and 4 were 310°, 315°, 320°, and 330° C. respectively. the polymer had an average residence time of 3 min 10 s in the apparatus. The inherent viscosity of the polymer was reduced from 1.64 to 0.88 dl/g.

A resin paste (A) was prepared as in Example 2. A modifier paste (B) was prepared by blending 600 parts of a 40% solution of the above cracked hydrocarbon polymer in styrene with 760 parts Camelwite grade calcium carbonate, 40 parts zinc stearate, 6 parts t-butyl perbenzoate and 3 parts each N,N'-m-phenylenedimaleimide and free radical catalyst. Paste A (150 g) was blended with 150 g paste B and 4 g magnesium oxide dispersion. The blend (249 g) was mixed with 49.8 g chopped fiberglass roving I. The mix was allowed to thicken and was molded for 6 min at 150° C. The sample had an exceptionally smooth surface and a notched Izod impact rating of 200 J/m notch.

EXAMPLE 7

Hydrocarbon polymer A was cracked as described in Example 6 except that the following conditions were used: 42 rpm, 3 min 15 s residence time, extruder profile of 190°, 260°, and 348° C. and a "Kenics" profile of 320°, 330°, 335°, and 345° C. The cracked polymer had an inherent viscosity of 0.43 dl/g.

Polymer (A) and modifier (B) pastes were prepared as in Example 6. Paste A (300 g) was blended with 42.9 g paste B and 4 g magnesium oxide dispersion. The blend (301.5 g) was mixed with 60.3 g of chopped fiberglass roving I. The mix was allowed to thicken and was molded. The molded sample had a very smooth surface and a notched Izod impact rating of 200 J/m notch.

EXAMPLE 8

A large batch of resin paste (A) was prepared as in Example 5 and a large batch of modifier paste (B) was prepared as in Example 5 except that hydrocarbon polymer A was used in place of hydrocarbon polymer B. Paste A (200 g) and 200 g paste B were blended together with 7 g magnesium oxide dispersion and the amounts of added curatives shown below. The blends were mixed with 20 parts chopped fiberglass roving I per 100 parts of paste, allowed to thicken and then molded. Results were as shown:

| Curative | Amount (g) | Notched Izod Impact Rating (J/m notch) |
|---|---|---|
| None | 0 | 180 |
| Divinylbenzene | 0.84 | 190 |
| N,N'-m-Phenylenedimaleimide | 0.86 | 290 |
| Triallylcyanurate | 0.79 | 220 |
| N,N'-m-Tolylenedimaleimide | 0.91 | 260 |

EXAMPLE 9

A resin paste (A) was prepared as in Example 5 except the vinyl ester resin was used. To 366 g of this paste was added 156.6 g of a 30% solution of hydrocarbon polymer A in styrene, 203.1 g Camelwite grade calcium carbonate, 6.3 g zinc stearate, 1.56 g t-butyl perbenzoate, 0.78 g each N,N'-m-phenylenedimaleimide and free radical catalyst, and 19.2 g magnesium oxide dispersion. Mixing was completed on a "Cowles" dissolver (7.6 cm blade high-shear mixer, manufactured by cowles Dissolver Corp.) This mixture (548.7 g) was blended with 137 g chopped fiberglass roving II in a Sigma mixer (a low-shear, low rpm mixer having a pair of sigmoidal shaped blades). The blend was allowed to thicken and was molded at 150° C. The sample had a notched Izod impact rating of 280 J/m notch compared to 200 J/m for a control containing no hydrocarbon polymer.

EXAMPLE 10

A resin paste (A) was prepared as in Example 5 except polyester resin IV was substituted for resin I. To 300 g of the paste was added 64.3 g of a 30% solution of chloroprene polymer A in styrene, 83.1 g Camelwite grade calcium carbonate, 2.6 g zinc stearate, 5.6 g magnesium oxide dispersion, 0.643 g t-butyl perbenzoate, and 0.32 g each N,N'-m-phenylenedimaleimide and free radical catalyst. Mixing was completed on a "Cowles" dissolver. The mix (507 g) was placed in a Sigma mixer and mixed with 126.7 g chopped fiberglass roving III. The mixture was allowed to thicken and molded at 150° C. The sample had a notched Izod impact rating of 260 J/m notch compared to 140 J/m for a control without the chloroprene polymer solution.

EXAMPLE 11

A resin paste (A) was prepared as in Example 5. To 300 g of the paste was added 64.3 g of a 30% solution of chloroprene polymer C in styrene, 83.1 g Camelwite grade calcium carbonate, 2.6 g zinc stearate, 5.6 g magnesium oxide dispersion, 0.64 g t-butyl perbenzoate and 0.32 g each N,N'-m-phenylenedimaleimide and free radical catalyst. Mixing was completed on a "Cowles" dissolver. The mix (488 g) was placed in a Sigma mixer and 122 g chopped fiberglass roving I added. The sample was allowed to thicken and was molded at 150° C. The molded sample had a notched Izod impact rating of 200 J/m notch compared to 130 J/m for the unmodified control.

EXAMPLE 12

A sample of chloroprene polymer D was milled for 30 min at 50° C. to reduce its Mooney viscosity to ML-10=17.7. A 30% solution of the milled polymer was prepared in styrene. A polyester paste (A) was prepared from 600 parts of polyester resin I, 776 parts Camelwite grade calcium carbonate, 24 parts zinc stearate, 6 parts t-butylperbenzoate and 3 parts each of N,N'-m-phenylenedimaleimide and free-radical catalyst. Paste A (400 g) was blended in a Cowles mixer with 87.5 g of the milled chloroprene polymer D solution, 110.9 g of Camelwite grade calcium carbonate, 3.4 g of zinc stearate, 10.5 g magnesium oxide dispersion, 0.875 g t-butyl perbenzoate, and 0.438 g each of N,N'-m-phenylenedimaleimide and free-radical catalyst. The blend, 510 g, was mixed with 127.5 g of chopped fiberglass roving II in a Sigma mixer and the mix was allowed to stand at room temperature for several days prior to molding into 3×150×150 mm slabs for 2 min at 150° C. The sample had a notched Izod rating of 208 J/m notch and had a very smooth surface such as would be suitable for exterior automotive use. A control without the elastomer and N,N'-m-phenylenedimaleimide had a notched Izod rating of 187 J/m notch and was warped and had a severely mottled surface. In another control, a commercial acrylic low-profile agent (Rohm and Haas Paraplex P 701, believed to be a solution of a copolymer of methyl methacrylate in styrene) 114 g was blended with 400 g of paste A, 147 g Camelwite grade calcium carbonate, 4.6 g zinc stearate and 11.7 g of magnesium oxide dispersion and 1.14 g of t-butylperbenzoate. This blend, 507 g and 126.7 g of chopped fiberglass roving II were mixed in a Sigma mixer, allowed to mature and molded for 2 min at 150° C. The molded plaques had a notched Izod rating of 150 J/m notch and had a fairly good surface but would require minor sanding for automotive use.

The following examples demonstrate the relative impact strength of various compositions as measured by means of the Gardner Impact Crack Area Test. This test was made using a Gardner heavy duty variable impact tester. The weight was dropped from several different heights onto different unsupported sections of the plaque. The cracks on the reverse side were made visible by staining with a dye. Rectangles, sides parallel to the plaque sides of the length and width of the crack, were drawn around each crack and this area measured. Crack area is reported in square millimeters as a function of impact energy in joules.

The ingredients used in these Examples are listed below.

(1) Hydrocarbon polymer A: an ethylene/47% propylene/3.3% 1,4-hexadiene polymer of Mooney viscosity 20 ML 4 (100° C.) and inherent viscosity 1.6 dl/g.
(2) Polyester resin I: a high reactivity resin believed to contain approximately 70% propylene glycol maleate and 30% styrene, sold as "Paraplex" P340 by Rohm & Haas Co.
(3) Hydrocarbon polymer C: polyisoprene, Mooney viscosity ML 10=65, sold as "Natsyn" 2210 by Goodyear Chemical Co.
(4) Hydrocarbon polymer D: Liquid polybutadiene (bulk viscosity, 46 poise at 30 C; hydroxyl value, 0.81 mg/g) sold as Poly BD Resin R45HT by Arco Chemical Co.
(5) Chopped fiberglass roving III: 1.27 cm roving sold as OCF KM832 by Owens Corning Fiberglass Co.
(6) Free radical catalyst: 45% 2,5-dimethyl-2,5-bis(t-butyl peroxy)hexyne-3 on an inert carrier, sold as "Luperco" 130XL by the Lucidol Division of Pennwalt.
(7) Magnesium oxide dispersion: 33% magnesium oxide dispersed in an unsaturated polyester, sold as "Marco" Modifier M by W. R. Grace.
(8) Hydrocarbon polymer E: believed to be ultra-fine polyethylene powder, sold by Kopper Chemical Co. as LPP100.
(9) Hydrocarbon polymer F: 48% ethylene/52% propylene copolymer, Mooney viscosity ML 4 (121° C.) 31.
(10) Hydrocarbon polymer G: believed to be a 95/5 butadiene/styrene copolymer, molecular weight 1900, sold as "Lithene" AH by Lithium Corporation of America.

EXAMPLE 13

A large batch of polyester paste A was prepared on a "Cowles" dissolver by blending until uniform 600 parts polyester resin I, 776 parts Camelwite grade calcium carbonate, 24 parts zinc stearate, 6 parts t-butyl perbenzoate, and 3 parts each N,N'-m-phenylenedimaleimide and free radical catalyst. Portions of A were mixed on the "Cowles" dissolver with modifier solutions, fillers and additional curatives in the order shown in Table I. Quantities shown in columns headed "t-Butyl Perbenzoate", "N,N'-m-Phenylenediamleimide", and "Free Radical Catalyst" are the total amounts, i.e., include those supplied in Paste A. The mixture (weight shown) was transferred to a Sigma mixer and mixed with the amount of chopped fiberglass roving II shown in Table I. Quantities of all materials listed in Table I are in grams. Samples were allowed to stand several days and then were molded as shown into 150×150×3 mm plaques. Physical test results are shown in Table II.

TABLE I

| Sample | Polyester Paste A | Modifier/Filler | t-Butyl Perbenzoate | N,N'-m-Phenylene-dimaleimide |
|---|---|---|---|---|
| 1 | 400 | 85.7 B/114.3 | 2.56 | 1.28 |
| 2 | 400 | 171.4 C/228.6 | 3.42 | 1.71 |
| 3 | 400 | 19.04 D/ 25.4 | 1.90 | 0.95 |
| 4 | 400 | 85.7 E/114.3 | 2.56 | 1.28 |
| 5 | 400 | 30.24 D/ 40.3 | 2.01 | 1.05 |
| 6 | 366 | 156.6 B/209.4 | 3.13 | 1.56 |
| 7 | 400* | — | 1.71 | — |
| 8 | 400 | 85.7 F/114.3 | 2.56 | 1.28 |

| Sample | Free Radical Catalyst | Magnesium Oxide Dispersion | Actual Wt. to Mixer | Weight Chopped Fiberglass Roving II | Cure Time (min at 150° C.) |
|---|---|---|---|---|---|
| 1 | 1.28 | 10.5 | 504 | 126 | 2 |
| 2 | 1.71 | 14.0 | 528 | 132 | 4 |
| 3 | 0.95 | 10.5 | 578 | 144.5 | 2 |
| 4 | 1.28 | 10.5 | 533 | 133.3 | 2 |
| 5 | 1.05 | 10.5 | 567 | 141.7 | 2 |
| 6 | 1.56 | 12.8 | 555 | 138.7 | 2 |
| 7 | — | 10.5 | 476 | 119 | 2 |

TABLE I-continued

| | | | | |
|---|---|---|---|---|
| 8 | 1.28 | 10.5 | 463 | 115.7 | 2 |

Modifier B: 30% hydrocarbon polymer C in styrene
Modifier C: 20% hydrocarbon polymer C in styrene
Modifier D: hydrocarbon polymer D
Modifier E: 30% hydrocarbon polymer D in styrene
Modifier F: 30% hydrocarbon polymer A in styrene
Filler: mixture of 1000 parts Camelwite grade calcium carbonate and 31 parts zinc stearate
*Made from a paste analogous to Paste A but not containing any N,N'-m-phenylenedimaleimide nor any free radical catalyst.

TABLE II

| Sample | Notched Izod Impact (J/m notch) | Gardner Impact Crack Area (mm²) at Impact Shown (J) | | | |
|---|---|---|---|---|---|
| | | 0.565J | 0.113J | 0.226J | 0.339J |
| 1 | 160 | 44 | 65 | 85 | 146 |
| 2 | 160 | 13 | 55 | 65 | 82 |
| 3* | | | | | |
| 4* | | | | | |
| 5* | | | | | |
| 6 | 140 | 6 | 15 | 27 | 32 |
| 7 | 250 | 120 | 117 | 222 | 210 |
| 8 | 250 | 11 | 76 | 93 | 128 |

| Sample | Gardner Impact Crack Area (mm²) at Impact Shown (J) | | |
|---|---|---|---|
| | 0.452J | 0.565J | 0.791J |
| 1 | 107 | 171 | 156 |
| 2 | 102 | 97 | 143 |
| 3* | | | |
| 4* | | | |
| 5* | | | |
| 6 | 37 | 64 | 76 |
| 7 | 353 | 432 | 304 |
| 8 | 100 | 131 | 176 |

*These samples had sticky areas, many voids and very poor surfaces. It was not possible to obtain meaningful test results.

EXAMPLE 14

A batch of resin paste A was prepared as in Example 12 except that the inorganic component consisted of 760.5 parts Camelwite grade calcium carbonate and 39.5 parts zinc stearate. The rest of the procedure was as in Example 12 except that chopped fiberglass roving III was used. Quantities of the various ingredients are shown in Table III just as in Table I, Example 13. Physical test results are shown in Table IV.

TABLE III

| Sample | Resin Paste A | Modifier/Filler | t-Butyl Perbenzoate | N,N'-m-Phenylenediamleimide |
|---|---|---|---|---|
| 1 | 300* | 14.3 B / 19.1 | 1.43 | — |
| 2 | 150 | 64.3 C / 85.7 | 1.28 | 0.64 |
| 3 | 300 | 14.3 D / 19.1 | 1.43 | 0.71 |
| 4 | 300 | 64.3 F / 85.7 | 1.93 | 0.96 |
| 5 | 300 | 64.3 G / 85.7 | 1.93 | 0.96 |

| Sample | Free Radical Catalyst | Magnesium Oxide Dispersion | Actual Wt. to Mixer | Actual Wt. Chopped Fiberglass Roving III |
|---|---|---|---|---|
| 1 | — | 5.6 | 413 | 103.2 |
| 2 | 0.64 | 3.7 | 421 | 105.2 |
| 3 | 0.71 | 5.6 | 388 | 97 |
| 4 | 0.96 | 5.6 | 367 | 91.7 |
| 5 | 0.96 | 5.6 | 418 | 104.5 |

Modifier B: Hydrocarbon polymer E
Modifier C: 20% Hydrocarbon polymer F in styrene
Modifier D: Hydrocarbon polymer G
Modifier F: 30% Hydrocarbon polymer A in styrene
Modifier G: 30% Chloroprene polymer A in styrene
Filler: mixture of 1000 parts Camelwite grade calcium carbonate and 52 parts zinc stearate.
*Made from a paste analogous to Paste A but not containing any N,N'-m-phenylenedimaleimide nor any free radical catalyst.

TABLE IV

| Sample | Notched Izod Rating (J/m notch) | Gardner Impact Crack Area (mm²) at Impact Shown (J) | | |
|---|---|---|---|---|
| | | 0.0565J | 0.113J | 0.226J |
| 1 | 150 | 30 | 64 | 130 |
| 2 | 280 | 45 | 15 | 30 |
| 3* | | | | |
| 4 | 240 | 35 | 110 | 132 |
| 5 | 250 | 25 | 9 | 120 |

| Sample | Gardner Impact Crack Area (mm²) at Impact Shown (J) | | |
|---|---|---|---|
| | 0.339J | 0.452J | 0.565J |
| 1 | 168 | 255 | 180 |
| 2 | 80 | 190 | 144 |
| 3* | | | |
| 4 | 120 | 126 | 182 |
| 5 | 98 | 156 | 168 |

*This sample had sticky areas, many voids and a very poor surface. It was not possible to obtain meaningful test results.

Industrial Applicability

The compositions of the present invention, particularly those containing glass fiber reinforcement, can be used in the manufacture of strong, lightweight products having excellent surface characteristics, such as automobile body parts, furniture, appliance housings, trays, etc.

Best Mode

Although the best mode of the present invention, i.e., the single most preferred elastomer modified molding composition, will depend upon the particular desired end use and the specific requisite combination of properties for that use, the single most preferred composition of the present invention is described in detail in Example 14 as Sample 5. This composition has the best overall combination of properties and processability. It is also particularly well suited for automotive applications.

I claim:

1. A filled, unsaturated ester molding composition comprising:
   (a) 10–60 weight percent of an $\alpha,\beta$-ethylenically unsaturated ester polymerizable molding resin, the unsaturation number of said resin being between about 150 and 250,
   (b) 39–89 weight percent of a polymerizable monomer, and
   (c) 1–30 weight percent of an elastomeric modifier selected from the group consisting of chloroprene polymers and hydrocarbon polymers, wherein the chloroprene polymer is selected from the group consisting of homopolymers of chloroprene, copolymers of chloroprene with sulfur, copolymers of chloroprene with at least one copolymerizable organic monomer, and copolymers of chloroprene with sulfur and at least one copolymerizable organic monomer, wherein chloroprene constitutes at least 50 weight percent of the organic monomer make-up of the copolymer, and wherein the hydrocarbon polymer is selected from the group consisting of ethylene/propylene dipolymers and copolymers of ethylene, propylene and at least one nonconjugated diene.

2. The composition of claim 1 wherein the molding resin is selected from the group consisting of polyester molding resins and vinyl ester molding resins.

3. The composition of claim 1 wherein the elastomeric modifier is selected from the group consisting of chloroprene polymers and hydrocarbon polymers.

4. The composition of claim 2 wherein the molding resin is polyester molding resin.

5. The composition of claim 3 wherein the hydrocarbon polymer comprises about 30-70 weight percent ethylene, about 20-60 weight percent propylene and 0-10 weight percent of at least one nonconjugated diene.

6. The composition of claim 1 further comprising 0.1-5 parts by weight of polymerization catalyst per 100 parts of said composition and 15-50 parts by weight of inorganic particulate filler per 100 parts of said composition.

7. The composition of claim 5 further comprising up to 2.5 parts by weight of at least one coagent selected from the group consisting of dimaleimides and triallylcyanurates per 100 parts of said composition.

8. A molded polyester article produced from the composition of claim 1.

* * * * *

Disclaimer 4,161,471.—*Robert James Kassal,* Wilmington, Del. ELASTOMER MODIFIED UNSATURATED MOLDING COMPOSITIONS. Patent dated July 17, 1979. Disclaimer filed Nov. 12, 1981, by the assignee, *E. I. du Pont de Nemours and Co.*

Hereby enters this disclaimer to claims 1-8 of said patent.

[*Official Gazette March 2, 1982.*]